United States Patent
Dettinger et al.

(10) Patent No.: US 7,610,263 B2
(45) Date of Patent: Oct. 27, 2009

(54) REUSING INTERMEDIATE WORKFLOW RESULTS IN SUCCESSIVE WORKFLOW RUNS

(75) Inventors: Richard D. Dettinger, Rochester, MN (US); Thomas J. Eggebraaten, Rochester, MN (US); Terrence R. O'Brien, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1230 days.

(21) Appl. No.: 10/733,973

(22) Filed: Dec. 11, 2003

(65) Prior Publication Data

US 2005/0131941 A1    Jun. 16, 2005

(51) Int. Cl.
*G06F 7/00* (2006.01)
*G06F 17/30* (2006.01)

(52) U.S. Cl. .......................................... 707/2
(58) Field of Classification Search ........................ None
See application file for complete search history.

(56) References Cited

U.S. PATENT DOCUMENTS 6,725,227 B1    4/2004  Li
6,748,386 B1*   6/2004  Li ............................... 707/10
2003/0191769 A1* 10/2003 Crisan et al. ................ 707/100

OTHER PUBLICATIONS

Dettinger et al., IBM Patent Application ROC920030277US1, filed Nov. 24, 2003, "Dynamic Functional Module Availability".
Dettinger et al., IBM Patent Application ROC920030278US1, filed Nov. 24, 2003, "Method for Invoking and Integrating Multiple Functional Modules".

* cited by examiner

*Primary Examiner*—Neveen Abel Jalil
*Assistant Examiner*—Michael J Hicks
(74) *Attorney, Agent, or Firm*—Patterson & Sheridan, LLP

(57) ABSTRACT

Methods, articles of manufacture and systems for managing execution of a multi-step workflow in which one or more steps are repeatedly executed on data of a database. One embodiment provides a method comprising receiving current input for execution of a step of the workflow on relevant data of the database, wherein the step has been previously executed on the relevant data using previous input identical to the current input and wherein the previous execution of the step produced previous output; determining whether the step is deterministic, whereby the step generates identical output for given input in repeated executions of the step on the relevant data; and, if the step is deterministic, returning the previous output produced during the previous execution of the step without re-executing the step.

32 Claims, 5 Drawing Sheets

REUSING INTERMEDIATE WORKFLOW RESULTS IN SUCCESSIVE WORKFLOW RUNS

CROSS-REFERENCE TO RELATED APPLICATIONS

The present invention is related to the commonly owned, co-pending U.S. patent applications, entitled "Dynamic Functional Module Availability" 10/720960 and "Method for Invoking and Integrating Multiple Functional Modules" Ser. No. 10/720693, both filed Nov. 24, 2003, which are hereby incorporated herein in their entirety.

BACKGROUND OF THE INVENTION

1. Field of the Invention

The present invention generally relates to data processing and, more particularly, to managing execution of a workflow in successive workflow runs.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application, the operating system or an end user) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One of the issues faced by data mining and database query applications, in general, is the manner in which the data is processed prior to being presented to the end user. A number of software solutions support the use of multiple functional modules to process data as desired by the user, but management of functional modules execution is difficult. For example, a query building tool will present the user with a list of functional modules that aid in building queries and analyzing query results. Often times, execution of numerous functional modules are needed to compile the data in the desired state. Unfortunately, the selected functional modules need to be invoked individually by the user. This can be a very inconvenient and inefficient process for invoking multiple functional modules.

Current workflow technology provides the ability to call multiple functional modules in a specified order, but there is an accompanying drawback: users are required to perform data transformation each time data is passed from one functional module to another. For example, if four functional modules, FM1, FM2, FM3, and FM4 are called (respectively) and each successive functional module depends on a result set produced by the functional module executed immediately prior to it, data transformation would need to be performed by the user three separate times: between FM1 and FM2, FM2 and FM3, FM3 and FM4.

Users typically employ two methods for performing the data transformation. One method comprises creating a custom program, or functional module, for extracting data from the result set produced by the first functional module and then formatting it in accordance with the requirements of the next functional module to be executed. For example, a custom program would be used to transform the result set produced by FM1 and prepare the data to be passed as input to FM2. Of course, this would need to happen with data produced by FM2, and again with FM3's result set. Another method consists of utilizing mapping tools to allow for the mapping of data fields from one program to the next. For example, the mapping tool would allow the user to map the output fields of FM1 to the input fields of FM2. The fields are mapped by users prior to execution of the programs. At runtime, data is transformed per the field mapping definitions. Both of these methods for performing data transformation are cumbersome and inefficient to use and depend heavily on user interaction.

Another shortcoming of the prior art, is the manner in which repeated executions of functional modules in multi-step workflows are managed. By way of example, assume that FM1 is repeatedly executed for a given input, IP1, and produces the identical result set RS1 each time. That is, execution of FM1 is absolutely deterministic in that it produces the same result set for the same input. Despite this level of determinism, FM1 is, nevertheless, executed each time it is invoked and takes IP1 as input. This can be very unproductive and inefficient, particularly if each execution of FM2 is complex and requires a substantial amount of processing resources and time. Moreover, this frequently leads to user frustration, especially when running time-consuming multi-step workflows requiring execution of a large amount of functional modules.

Therefore, there is a need for a technique for managing repeated executions of functional modules in multi-step workflows.

SUMMARY OF THE INVENTION

The present invention generally provides methods, articles of manufacture and systems for managing execution of a multi-step workflow, in which one or more steps are repeatedly executed for the same input.

One embodiment provides a method comprising receiving current input for execution of a step of the workflow on relevant data of the database, wherein the step has been previously executed on the relevant data using previous input identical to the current input and wherein the previous execution of the step produced previous output, determining whether the step is deterministic, whereby the step generates identical output for given input in repeated executions of the step on the relevant data, and, if the step is deterministic, returning the previous output produced during the previous execution of the step without re-executing the step.

Another embodiment provides a method comprising receiving current input for execution of a step of the workflow on relevant data of the database, wherein the step generates identical output for given input in repeated executions of the step on the relevant data, and, without executing the step using the current input, returning output obtained in a previous execution of the step using input identical to the current input.

Still another embodiment provides a computer readable medium containing a program which, when executed, performs an operation of managing execution of a multi-step workflow that is repeatedly executed on data of a database. The operation comprises receiving current input for execution of a step of the workflow on relevant data of the database, wherein the step has been previously executed on the relevant data using previous input identical to the current input and wherein the previous execution of the step produced previous output, determining whether the step is deterministic, whereby the step generates identical output for given input in repeated executions of the step on the relevant data, and, if the step is deterministic, returning the previous output produced during the previous execution of the step without re-executing the step.

Still another embodiment provides a computer readable medium containing a program which, when executed, performs an operation of managing execution of a workflow that is repeatedly executed on data of a database, the operation comprising receiving current input for execution of a step of the workflow on relevant data of the database, wherein the step generates identical output for given input in repeated executions of the step on the relevant data, and, without executing the step using the current input, returning output obtained in a previous execution of the step using input identical to the current input.

Still another embodiment provides a computer system, comprising a database having data, and a workflow execution manager residing in memory for managing execution of a multi-step workflow that is repeatedly executed on the data of the database. The workflow execution manager is configured for receiving current input for execution of a step of the workflow on relevant data of the database, wherein the step has been previously executed on the relevant data using previous input identical to the current input and wherein the previous execution of the step produced previous output, determining whether the step is deterministic, whereby the step generates identical output for given input in repeated executions of the step on the relevant data, and, if the step is deterministic, returning the previous output produced during the previous execution of the step without re-executing the step.

Still another embodiment provides a computer system, comprising a database having data, and a workflow execution manager residing in memory for managing execution of a workflow that is repeatedly executed on the data of the database, the workflow execution manager being configured for receiving current input for execution of a step of the workflow on relevant data of the database, wherein the step generates identical output for given input in repeated executions of the step on the relevant data, and, without executing the step using the current input, returning output obtained in a previous execution of the step using input identical to the current input.

Still another embodiment provides a data structure residing in memory, comprising a specification of at least one step of a multi-step workflow. The specification includes an indication of at least one functional module adapted for execution of the at least one step, and a deterministic flag indicating whether the at least one step generates identical output for given input in repeated executions of the step on relevant data of a database.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
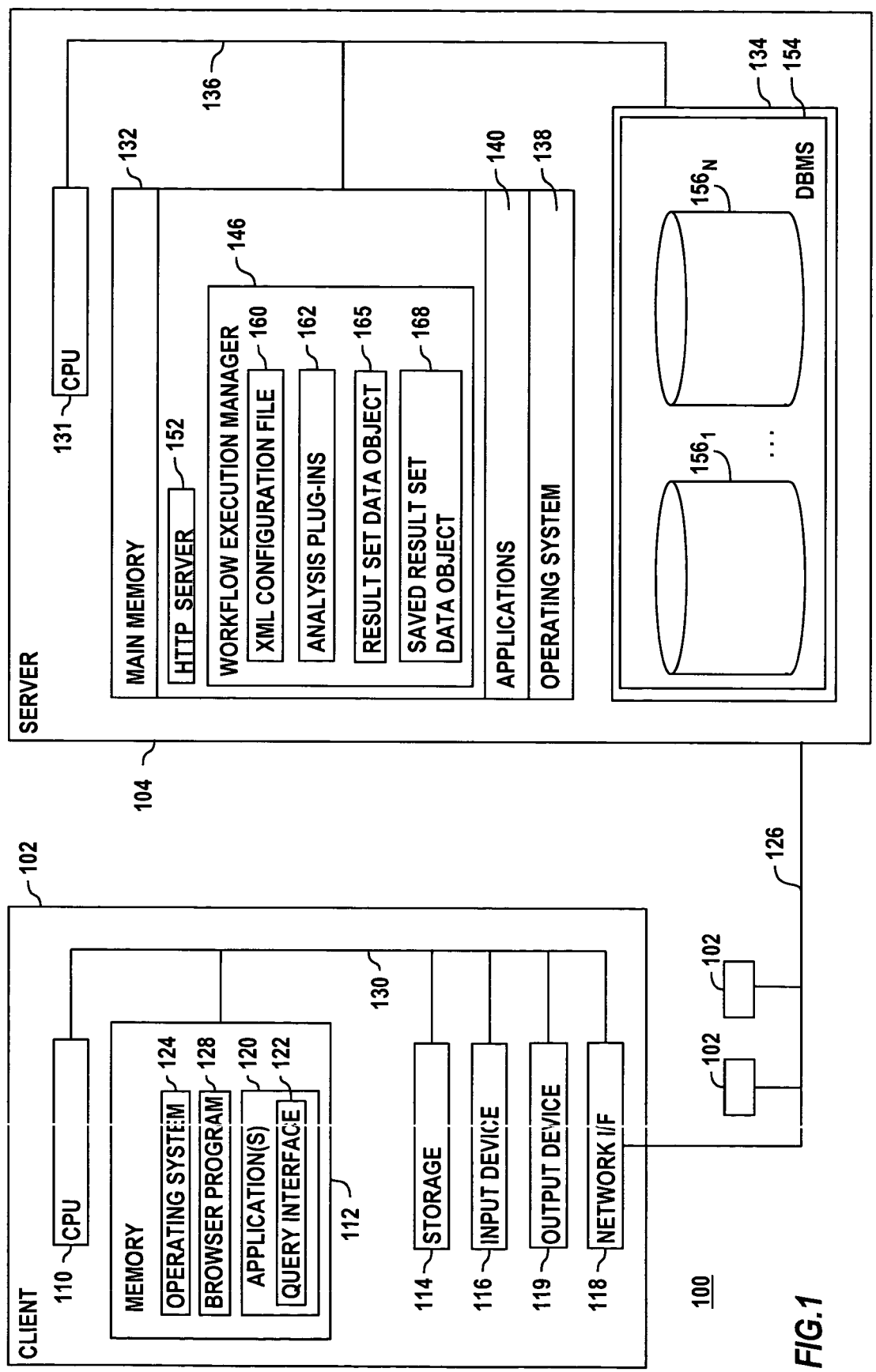
FIG. 1 is a computer system illustratively utilized in accordance with the present invention.

The present invention generally is directed to methods, articles of manufacture and systems for managing execution of a multi-step workflow in which one or more steps are repeatedly executed for the same input.

In one embodiment, current input is received for execution of a step of the multi-step workflow on relevant data of the database. The step is either deterministic or non-deterministic. A deterministic step is one that generates identical output for given input in repeated executions of the step on the relevant data. If the step is deterministic and has been previously executed on the relevant data, the previous output produced by the step has been saved to a database or file system together with the previous input (or some representation of the input, e.g., a hash table) and metadata identifying the deterministic step.

Before execution of the deterministic step using the current input, information related to the previous execution (e.g., the previous input and the metadata identifying the deterministic step) is retrieved from the database or file system. Thus, the previous input can be determined from the retrieved information. The previous input is compared to the current input to determine whether the current and previous inputs are identical. If it is determined that the current and previous inputs are identical, the previous output produced during the previous execution of the deterministic step is returned without executing the step.

Exemplary Application Environment

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, networked computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

As illustrated in FIG. 1, the system 100 generally includes client computers 102 and at least one server computer 104, connected via a network 126. In general, the network 126 may be a local area network (LAN) and/or a wide area network (WAN). In a particular embodiment, the network 126 is the Internet.

As illustrated, the client computers 102 (also referred to herein as clients) generally include a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a client 102 may include a display screen with an integrated touch-screen or a display with an integrated keyboard.

The network interface device 118 may be any entry/exit device configured to allow network communications between the client 102 and the at least one server computer 104 via the network 126. For example, the network interface device 118 may be a network adapter or other network interface card (NIC). If the client 102 is a handheld device, such as a personal digital assistant (PDA), the network interface device 118 may comprise any suitable wireless interface to provide a wireless connection to the network 126.

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Examples of suitable operating systems, which may be used to advantage, include Linux and Microsoft's Windows®, as well as any operating systems designed for handheld devices, such as Palm OS®, Windows® CE, and the like. More generally, any operating system supporting the functions disclosed herein may be used.

The memory 112 is also shown containing a query building interface 122 (also referred to herein as query interface) that, when executed on CPU 110, provides support for building queries. In one embodiment, the query interface 122 includes a web-based Graphical User Interface (GUI), which allows the user to display Hyper Text Markup Language (HTML) information. Functionality of the query interface 122 may be enhanced through the availability of one or more plug-in components. In one embodiment, elements of a query are specified by a user through the query building interface 122 which may be implemented using a browser program 128 presenting a set of GUI screens for building queries. The content of the GUI screens may be generated by application(s) 140 of the at least one server computer 104. In a particular embodiment, the GUI content is hypertext markup language (HTML) content which may be rendered on the client computer systems 102 with the query building interface 122. Accordingly, the at least one server 104 (also referred to herein as the server) may include a Hypertext Transfer Protocol (http) server process 152 (e.g., a web server) adapted to service requests from the client computer 102. For example, the server process 152 may respond to requests to access one or more databases $156_1$ to $156_N$ (commonly referred to as database(s) 156), which illustratively reside on the server 104. Incoming client requests for data from one or more databases 156 invoke an application 140 which is configured to perform operations necessary to access the database(s) 156. In one embodiment, the application 140 comprises a plurality of servlets configured to build GUI elements, which are then rendered by the query interface 122.

The server 104 may be physically arranged in a manner similar to the client computer 102. Accordingly, the server 104 is shown generally comprising a CPU 131, a memory 132, and a storage device 134, coupled to one another by a bus 136. Memory 132 may be a random access memory sufficiently large to hold the necessary programming and data structures that are located on the server 104. Illustratively, storage device 134 includes the databases 156 that are managed by a database management system (DBMS) 154.

The server 104 is generally under the control of an operating system 138 shown residing in memory 132. Examples of the operating system 138 include IBM OS/400® UNIX, Microsoft Windows®, and the like. More generally, any operating system capable of supporting the functions described herein may be used.

As illustrated, the server 104 may be configured with a workflow execution manager 146. Illustratively, the workflow execution manager 146 is provided by the memory 132. Alternatively, the workflow execution manager 146 can be embedded in an application 140 or the operating system 138. The workflow execution manager 146 is configured for managing execution of multi-step workflows on data of the database(s) 156. Specifically, the workflow execution manager 146 can invoke a functional module from a set of functional modules 162 for execution of each step of a given multi-step workflow. The functional modules 162 may be invoked in a prescribed or derived sequence, without requiring data transformation.

As used herein, the phrase functional module generally refers to a set of coded instructions that enable a computer to perform a specified function. Plug-in components, analysis routines, functions or programs among other terms may constitute functional modules. Further, functional modules may be implemented internally or externally to a system, while remaining accessible by that system. While a functional module may exist in any or all of these forms, to facilitate understanding, the term plug-in will be used to refer to any functional module described herein. While the following description focuses on selecting the subset of plug-ins related to an application designed for the building and initiating of a query, those skilled in the art will recognize that the methods described herein may be used with any applications that utilize plug-ins or other types of functional modules. Furthermore, it should be understood that by way of illustration reference is made to execution of plug-ins. However, execution of a plug-in should be understood as a synonym for execution of a step in a workflow.

A functional module can be associated with metadata. As used herein, the term metadata refers to descriptive information including the attributes of functional modules and result set data objects. Metadata associated with functional modules includes input requirements such as the number and type of required input and output (I/O) parameters and security requirements. Metadata may also comprise detailed information describing result sets returned from functional modules, such as column names, data types of columns, number of records returned, and content.

Further, as used herein, the term user may generally apply to any entity utilizing the data processing system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

The set of functional modules 162 (hereinafter generically referred to as plug-ins) can be specified by a corresponding XML configuration file 160. The user (e.g., a user of an application 120 running on a client computer 102) may configure the XML configuration file 160 via the query interface 122. The exact functions performed by the plug-ins may vary. For example, certain plug-ins may facilitate query building, while others provide printing support, or perform data analysis. Plug-ins 162 that perform data analysis often produce result sets packaged in result set data objects 165. Results set data objects produced by deterministic plug-ins 162 can be stored persistently as saved result set data objects 168 for reuse in subsequent executions. A deterministic plug-in is a plug-in which generates identical output for given input in repeated executions on relevant data of a database (e.g., one of databases 156). The data objects 165 and the saved data objects 168 may comprise result data along with metadata, such as field attributes, associated with corresponding result sets.

In one embodiment, the application 140 may present the user with one or more plug-ins 162, available via the query interface 122 (or some other interface). As mentioned above, these plug-ins may include analysis plug-ins that can be used to process data as desired by the user. Some plug-ins 162 may also be multi-analysis plug-ins, or plug-ins that are used to call other plug-ins. For example, if four separate plug-ins need to be called for a given multi-step workflow, rather than calling each of the four plug-ins 162 individually, the user may choose to call a multi-analysis plug-in. Using the multi-analysis plug-in, the workflow execution manager 146 can call each of the four plug-ins 162.

The user benefits from calling the multi-analysis plug-in because only one plug-in would need to be invoked, rather than four. Further, if the user calls each of the plug-ins 162 individually, an added step of data transformation or mapping would be needed. The multi-analysis plug-in, however, does not require data transformation or data mapping because result sets produced by plug-ins are packaged as result set data objects 165 which can be stored as saved result set data objects 168. Each plug-in 162 will be able to accept the result set as input and when processing is complete, provide a result set data object as output. In one embodiment, if a given plug-in 162 is deterministic, it may accept the result set as input and the saved result set data object can be provided as output thereof without executing the given plug-in 162, thus reducing overall execution time of the multi-analysis plug-in. As used herein, the term plug-in may also refer to multi-analysis plug-ins.

If multiple plug-ins (including multi-analysis plug-ins) need to be called, the sequence in which the plug-ins are invoked is based on the contents of the XML configuration file 160. Aside from containing metadata associated with the plug-ins, the XML configuration file 160 also contains instructions relating to the execution of the plug-ins, including directives outlining the sequence in which plug-ins should be executed. The use of either an explicit sequence or a derived sequence may be specified. Explicit sequences are chosen by users and registered in the XML configuration file 160 along with the plug-in 162 metadata when the plug-in 162 is added to the system. Derived sequences are determined at runtime based on various factors including available result set data objects 165 for use as input, and other system attributes.

The plug-ins 162, XML configuration file 160, result set data objects 165 and saved result set data objects 168 are illustratively implemented on the server 104, while the query interface 122 is implemented on the client computer 102. All of these system components—plug-ins 162, XML configuration files 160, result set data objects 165, saved result set data objects 168, and query interface 122—may be implemented or executed or both on any internal or external clients 102 of a networked system and be available to users (including applications) on any of the clients 102.

An Exemplary Runtime Environment

Figure 2:
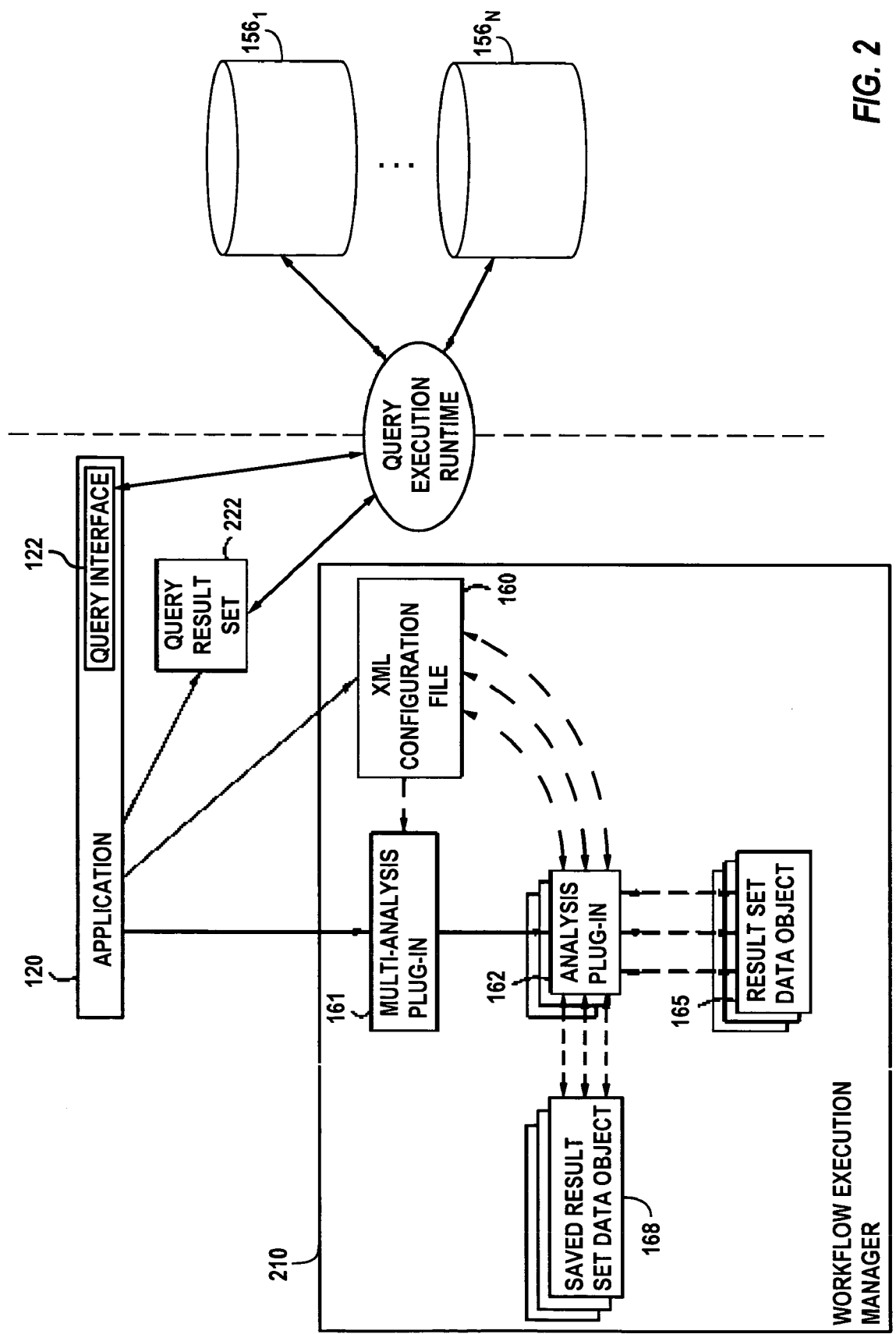
FIG. 2 is a relational view of software components in one embodiment of the present invention.

Before describing the process of invoking and integrating multiple plug-ins 162 in detail, however, operation of the various illustrated components of the system will be described with reference to FIG. 2. FIG. 2 illustrates a relational view of a client application 120 including a query interface 122, a workflow execution manager 210 (e.g., workflow execution manager 146) and the databases 156 at query execution runtime in one embodiment. Illustratively, the workflow execution manager 210 includes the plug-ins 162, XML configuration file 160, result set data objects 165, saved result set data objects 168 and an exemplary multi-analysis plug-in 161.

The application 120 may be used to build a query as designed by the user via the query interface 122. Once built, the query is executed against relevant data of one or more of the databases 156. In one embodiment, the query is executed by a corresponding plug-in of the plug-ins 162. After the query is executed, a query result set 222 is returned to the application 120. The application 120 may then invoke the workflow execution manager 210 to execute specific plug-ins 162 for performing operations as desired by the user. If invocation of multiple plug-ins is required, the workflow execution manager 210 invokes the appropriate multi-analysis plug-in 161, rather than invoking each required plug-in 162 individually. The workflow execution manager 210 then manages execution of all required plug-ins 162.

The application 120 may pass the workflow execution manager 210 the newly acquired result set 222 as input along with other required input parameters. Each analysis plug-in 162 executed by the workflow execution manager 210 may utilize a generic interface or signature as described in commonly owned co-pending application, entitled "Dynamic Functional Module Availability," filed Nov. 24, 2003 Ser. No. 10/720,960. Further, each plug-in can accept a result set data object 165 and produce a result set data object 165 as output. If a given plug-in is deterministic, the produced result set data object 165 can be stored persistently for subsequent executions of the given plug-in. Moreover, if a saved result set data object 168 can be retrieved for the given plug-in, execution of the plug-in can be omitted and the saved result set data object can be returned as the output. For example, a query relating to all micro-array data for a given experiment, is built and submitted to the query execution runtime, via the query building interface 122. Further, the user desires that two subsequent operations be performed on the result set 222 returned by the query execution runtime. First, the micro-array contained in the result set 222 needs to be normalized using a normalization plug-in, P1. Once the array is normalized, the next operation will call another plug-in, P2, to rank the normalized genes. After processing is completed, P1 will produce a result set data object 165 for use as input for P2. If executed, P2 will also produce a result set data object 165 after its processing is completed. However, assume now that P2 is deterministic and generates identical output for given input in repeated executions. Assume further that P2 has been previously executed on previous input identical to the result set data object 165 produced by P1 and that corresponding previous output has been stored as a saved result set data object 168. In this case it can be assumed that the saved result set data object 168 would be identical to a result set data object produced by execution of P2. Thus, the saved result set data object 168 can be retrieved and returned as output without executing P2.

Invoking and Integrating Multiple Plug-ins

Figure 3A:
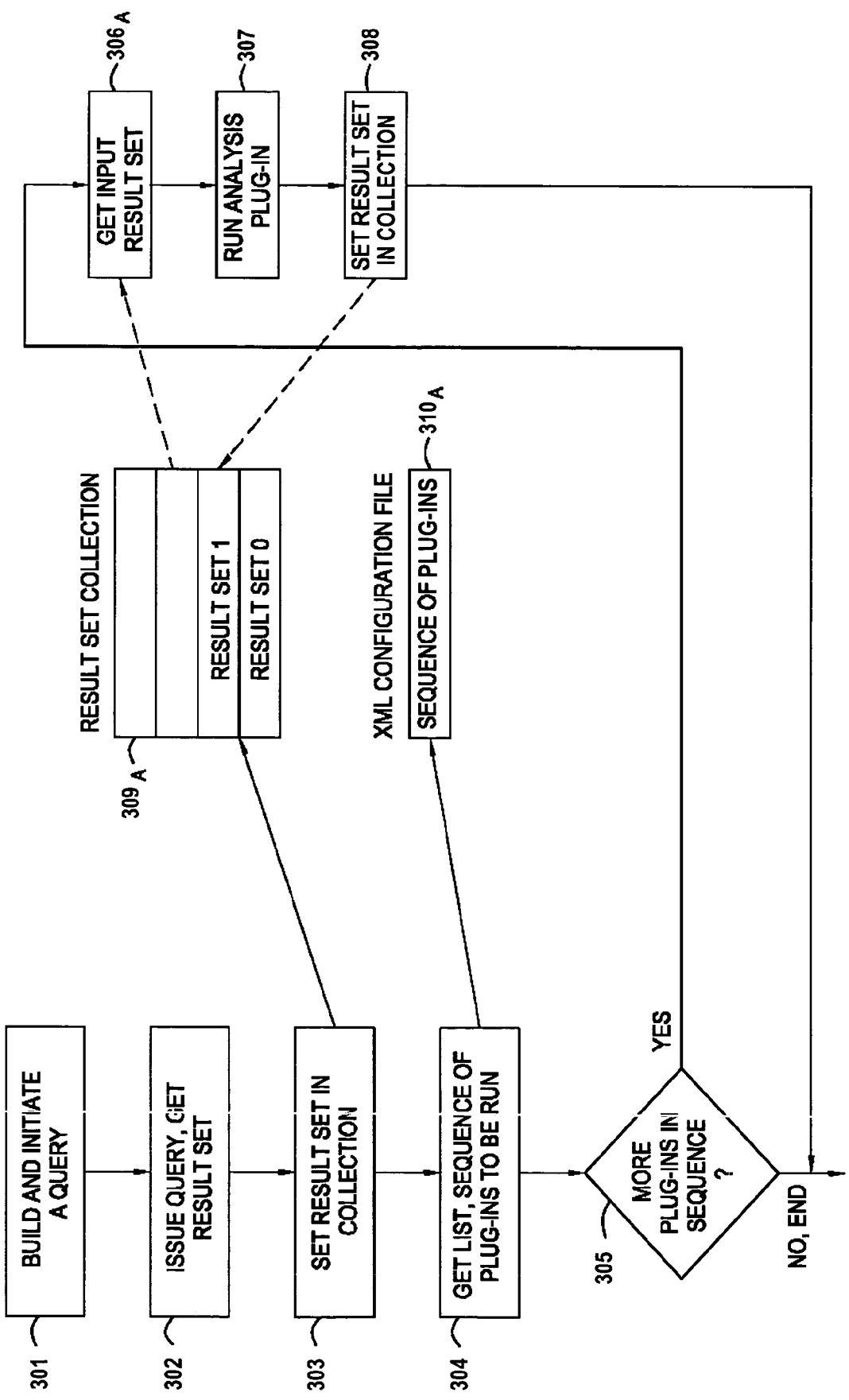
FIG. 3A is a flow chart illustrating exemplary operations utilizing an explicit sequence for plug-in execution, according to aspects of the present invention.
Figure 3B:
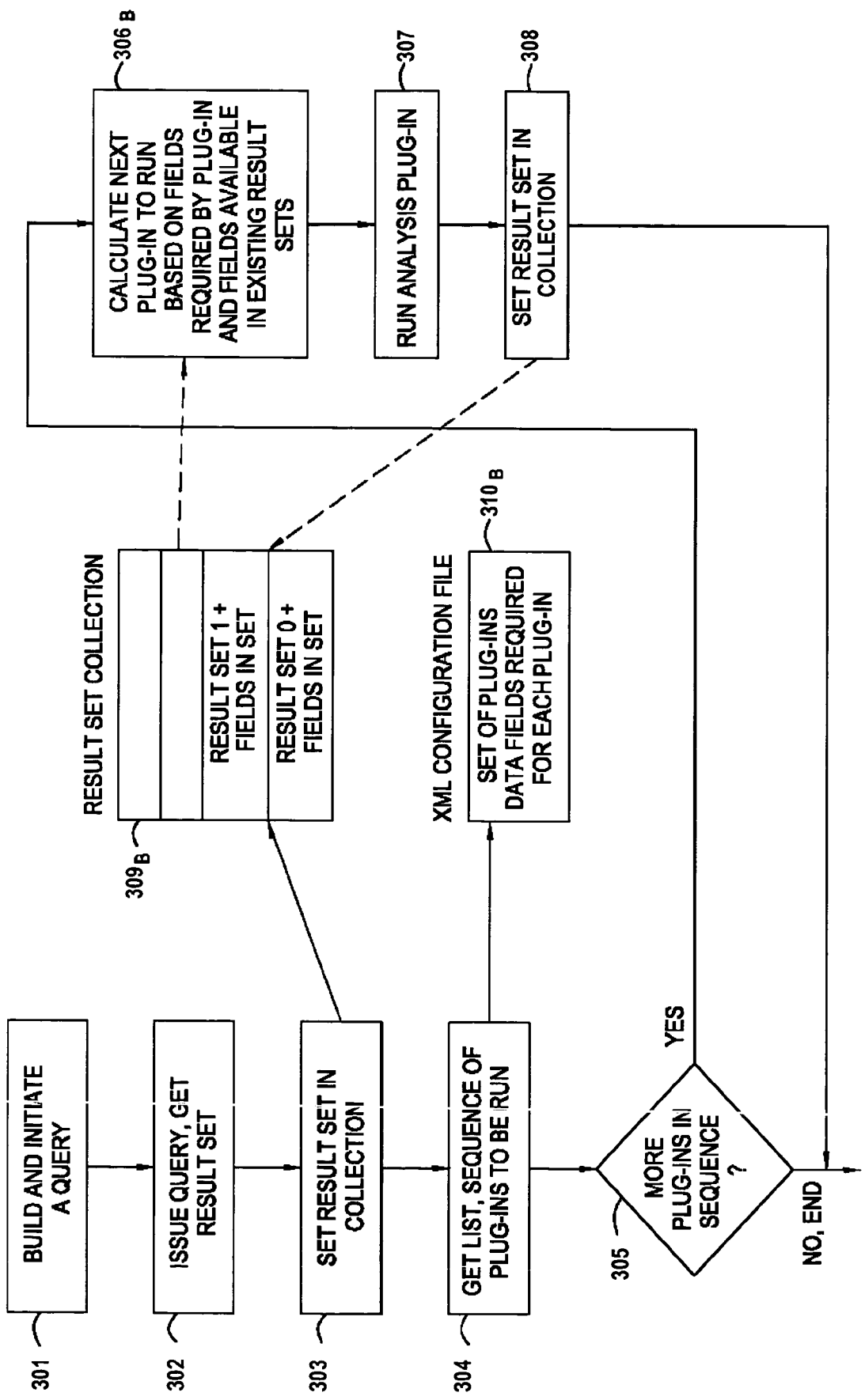
FIG. 3B is a flow chart illustrating exemplary operations utilizing a derived sequence for plug-in execution, according to aspects of the present invention.

FIGS. 3A and 3B are flow diagrams of exemplary operations for the invocation of a series of plug-ins (e.g., plug-ins 162 of FIG. 2) in an explicitly defined sequence (FIG. 3A) or derived sequence (FIG. 3B). At least part of the exemplary operations are performed by a workflow execution manager (e.g., workflow execution manager 210 of FIG. 2) and/or constituent functions thereof. Furthermore, if one or more plug-ins of the series of plug-ins are deterministic, supplementary operations can be performed for optimizing repeated execution of the deterministic plug-ins. An embodiment of exemplary supplementary operations is described with reference to FIG. 4.

The operations of FIGS. 3A, 3B and 4 may be described with reference to FIG. 2 and may be performed, for example, to further process the query result set 222. For some embodiments, the operations may be performed to build a query or analyze query results or both and dynamically invoke the necessary plug-ins in order to complete all processing specified by a user.

FIG. 3A focuses on operations for an explicitly defined sequence and begins at step 301, when a query is built and initiated by the user. After the query is built, at step 302, the user submits the query and receives corresponding results, i.e., query result set 222. During step 303, the results data and results metadata are compiled in a result set data object 165 which is placed in a result set collection $309_A$.

As mentioned before, the result set data object 165 may also contain detailed results information, or metadata, describing the query result set 222, such as column names, data types of columns and number of records returned. Further, results metadata may also include details of the content returned in the query result set 222. In other words, the results metadata may indicate the specific data values returned in the query result set 222.

At step 304, the workflow execution manager references the XML configuration file 160 and determines which plug-ins 162 need to be invoked. If multiple plug-ins are needed, an appropriate multi-analysis plug-in 161 is called. Further, based on registered plug-in definitions in the XML configuration file 160, it is determined if an explicit or derived sequence for plug-in execution is specified. The remainder of operations in FIG. 3A relate to an explicit sequence. First, the proper sequence is extracted from the XML configuration file 160 and passed to the multi-analysis plug-in 161 along with the result set data object 165. Illustratively, Table I below shows an excerpt from a sample XML configuration file which specifies an explicit sequence for plug-in execution. The sample XML configuration file contains an explicit sequence in which plug-ins (PLUGIN#1 and PLUGIN#2) may be invoked by a multi-analysis plug-in.

TABLE I

EXPLICIT SEQUENCE EXAMPLE

```
<Plugin xmlns:xsi="http://www.w3.org/2001/XMLSchema-instance"
    xsi:noNamespaceSchemaLocation="DQAPluginV1R3.xsd">
    <Extension className="com.ibm.dqa.plugin.analysis.PLUGIN#1" hidden="Yes"
        name="PLUGIN#1" point="com.ibm.dqa.plugin.analysis" deterministic="Yes">
        <Parms>
            <Field name="NoOpParm" hidden="Yes">
                <Type baseType="char"></Type>
                <Description>Hidden extra info</Description>
```

TABLE I-continued

EXPLICIT SEQUENCE EXAMPLE

```
            <Value val="Example Data" />
        </Field>
    </Parms>
    <PluginDesc>Test plugin - this has only hidden
        parameters.</PluginDesc>
</Extension>
<Extension className="com.ibm.dqa.plugin.analysis.PLUGIN#2" hidden="No"
    name="PLUGIN#2" point="com.ibm.dqa.plugin.analysis" deterministic="No">
    <Parms>
        <Field name="FakeParm1">
            <Type baseType="char"></Type>
            <Description></Description>
            <Value val="Example Default" />
        </Field>
        <Field name="FakeParm2">
            <Type baseType="int"></Type>
                <Description></Description>
                <Value val="1" />
        </Field>
    </Parms>
    <PluginDesc>This is an example plugin</PluginDesc>
</Extension>
<Extension name="MULTI-ANALYSIS PLUG-IN"
    point="com.ibm.dqa.plugin.analysis" deterministic="No" hidden="No">
    <Steps>
        <Step name="step1" extension="PLUGIN#1" input="parent"/>
        <Step name="step2" extension="PLUGIN#2" input="step1">
            <Parms>
                <Field name="ExampleParm1">
                    <Type baseType="int"></Type>
                    <Description></Description>
                    <Value val="3" />
                </Field>
                <Field name="FakeParm2">
                    <Type baseType="char"></Type>
                    <Description></Description>
                    <Value val="123456" />
                </Field>
            </Parms>
        </Step>
        <Step name="step3" extension="PLUGIN#2" input="step2"/>
        <Output name="step3"/>
    </Steps>
    <PluginDesc>Runs several plugins in step</PluginDesc>
</Extension>
</DQAPlugin>
```

At step 305, a loop of operations (306$_A$-308) to be performed for each plug-in 162 is entered. One embodiment of the loop of operations (306$_A$-308) to be performed for deterministic plug-ins is described in more detail below with reference to FIG. 4. At step 306$_A$, the result set data object 165 is obtained from the result set collection 309$_A$ for a current plug-in. Because the sequence of plug-in invocations is known, it is not necessary to review the results metadata available in the results set data object 165 to determine if input requirements are met. Instead, plug-ins 162 are simply run serially, as shown in step 307, in the order specified by the sequence. At step 308, after the current plug-in has completed processing, the result set data object 165 provided as output is placed back into the result set collection 309$_A$. Once the loop of operations has been performed for each plug-in, the final results are returned to the application 120 and may be presented to the user via the query interface 122.

FIG. 3B illustrates a flow diagram for the invocation of multiple plug-ins 162 in a derived sequence. The process of building a query, issuing the query, and placing the query result set 222 (returned by the query execution runtime) in a result set collection 309$_B$ are described by steps 301-303. These steps may be generally identical to the corresponding steps 301-303 in the explicit sequence based process described above with reference to FIG. 3A.

At step 304, as with the explicit process described above, the workflow execution manager refers to the XML configuration file 160 to generate a list of plug-ins 162 required to run. In this instance, however, the XML configuration file 160 specifies that the required plug-ins 162 can be invoked in a derived sequence. Accordingly, the appropriate multi-analysis plug-in 161 is called so that the workflow execution manager, in turn, can invoke all required plug-ins 162 in the proper order. In addition, because use of a derived sequence is specified, the multi-analysis plug-in 161 will also need to utilize information regarding plug-in input and output, included in the metadata associated with plug-ins 162, contained in the XML configuration file 160.

At step 305, a loop of operations (306$_B$-308) to be performed for each plug-in 162 is entered. One embodiment of the loop of operations (306$_B$-308) to be performed for deterministic plug-ins is described in more detail below with reference to FIG. 4. At step 306$_B$, the multi-analysis plug-in 161 chooses the next plug-in 162 to be invoked from a list of plug-ins 162 for which the available result set data objects 165, contained in the result set collection 309$_B$, satisfy all input requirements. The chosen plug-in 162 is then executed at step 307. At step 308, after processing is complete, the result set data object 165 produced by the plug-in 162 is made available for use by other plug-ins 162 by being placed in the result set collection $309_B$.

For example, the XML configuration file 160 may indicate that plug-ins 162 A1, A2, and A3, returning result sets RS1, RS2, and RS3 respectively, are required to run in a derived sequence. In addition, the XML configuration file 160 may indicate that the result set data objects 165 required as input for A1 include field F1. The field F3 is included in the output produced by A1. Similarly, field F2 is required by A2 and fields F4 and F5 are included in A2's output. Plug-in A3 requires fields F3 and F4 and provides output with fields F6 and F7. Further, the result set collection $309_B$ already contains a result set data object RS0 containing fields F1 and F2.

Accordingly, the workflow execution manager invokes plug-ins A1, A2, and A3. As described before, the workflow execution manager will manage the execution of all three plug-ins 162. Based on the information provided, it can be determined that the requirements of both A1 and A2 are satisfied by RS0, but A3 cannot be run because its input requirements are not met. At this point, either A1 or A2 can be invoked. In addition, both plug-ins can be executed in parallel. After processing completes for A1 and A2, result sets RS1, containing field F3, and RS2, with fields F4 and F5, are produced and available for use by A3. All requirements of A3's input are now satisfied, therefore, A3 is ready to be called.

Figure 4:
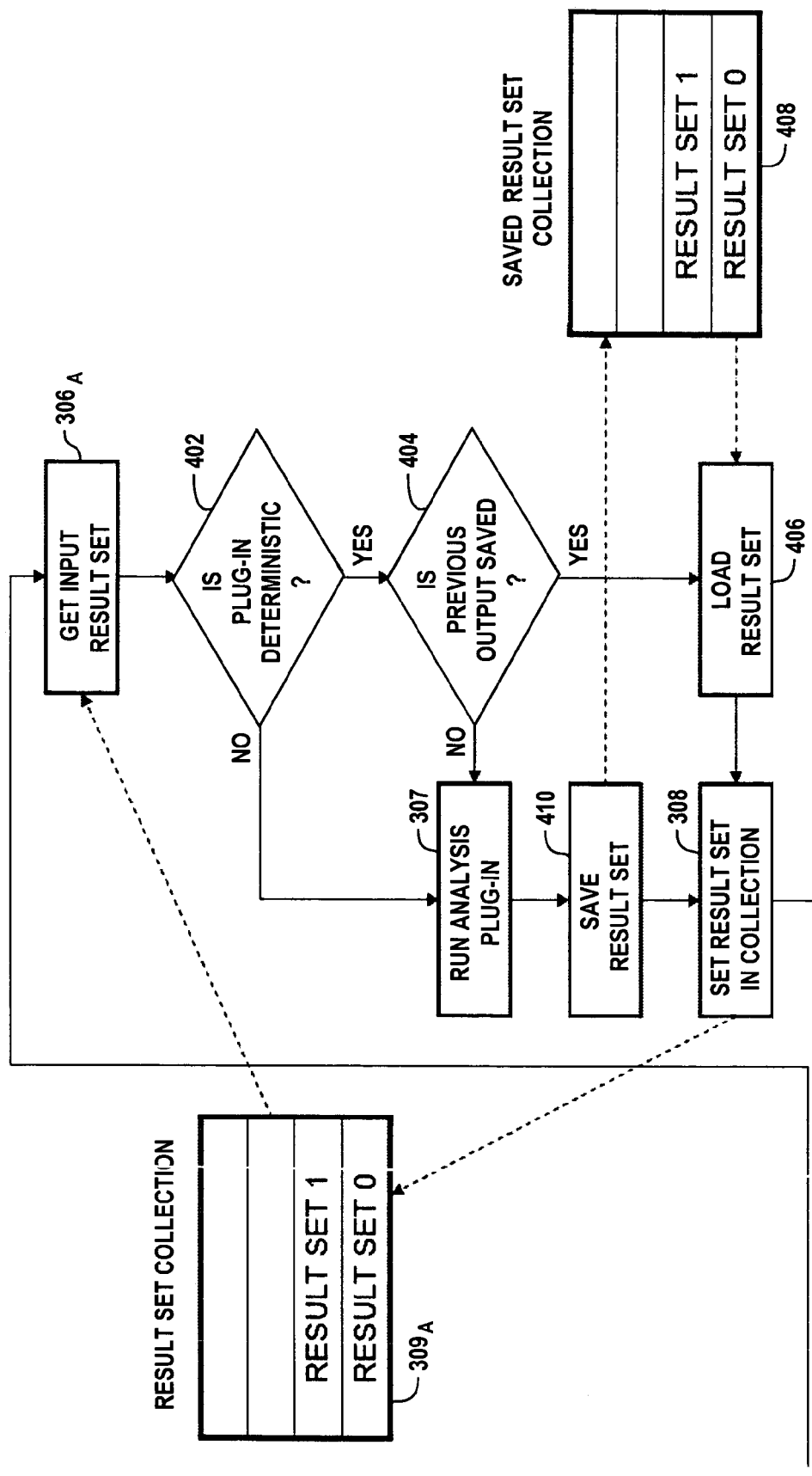
FIG. 4 is a flow chart illustrating exemplary operations for reusing intermediate results in execution of a multi-step workflow in one embodiment.

Referring now to FIG. 4, exemplary operations for optimizing repeated executions of deterministic plug-ins 162 (or multi-analysis plug-ins 161) are illustrated. The exemplary operations represent one embodiment of the loop of operations entered at step 305 of FIG. 3A or 3B (formed of steps $306_A$-308 in FIG. 3A and steps $306_B$-308 in FIG. 3B). For brevity, the exemplary operations of FIG. 4 are only explained as an embodiment of the loop of operations entered at step 305 of FIG. 3A.

For purposes of illustration, FIG. 4 is explained with reference to an exemplary explicitly defined sequence of steps shown in Table II below. Illustratively, Table II below shows an excerpt from a sample XML configuration file (e.g., XML configuration file 160) which specifies the explicit sequence for execution of deterministic plug-ins (e.g., plug-ins 162). The sample XML configuration file contains an explicit sequence of steps in which plug-ins (RemoveFieldPlugin and qualityCheck) may be invoked by a multi-analysis plug-in (e.g., multi-analysis plug-in 161). Each plug-in receives as input a result set data object (e.g., result set data object 165) and produces as output a result set data object, which can be stored persistently as a saved result set data object (e.g., saved result set data object 168).

TABLE II

EXPLICIT SEQUENCE EXAMPLE

| | |
|---|---|
| 001 | <Extension className="MultiStepAnalysisPlugin" name="ABCMultiStep" |
| 002 | point="com.ibm.dqa.plugin.analysis"> |
| 003 | <Step name="setup" deterministic="yes"> |
| 004 | <Plugin name="RemoveFieldPlugin" inputResults="parent"/> |
| 005 | <Parms> |
| 006 | <Field name="field" prompt="Field to remove"> |
| 007 | <Type baseType="field"></Type> |
| 008 | </Field> |
| 009 | </Parms> |
| 010 | </Plugin> |
| 011 | </Step> |

TABLE II-continued

EXPLICIT SEQUENCE EXAMPLE

| | |
|---|---|
| 012 | <Step name="qualityCheck" deterministic="yes"> |
| 013 | <Plugin name="FilterFieldPlugin" inputResults="setup"/> |
| 014 | <Parms> |
| 015 | <Field name="field" prompt="Field to filter"> |
| 016 | <Type baseType="field"></Type> |
| 017 | </Field> |
| 018 | <Field name="value" prompt="Value to filter"> |
| 019 | <Type baseType="char"></Type> |
| 020 | </Field> |
| 021 | </Parms> |
| 022 | </Plugin> |
| 023 | </Step> |
| 024 | <OutputResults name="qualityCheck"/> |
| 025 | </Extension> |

More specifically, the exemplary explicit sequence of Table II illustrates a workflow with two steps, a first step "setup" (lines 003-011) and a second step "qualityCheck" (lines 012-023). The first step consists in executing a plug-in "RemoveFieldPlugin" (lines 004-010) which receives as current input a result set data object "parent" (line 004). A result set data object produced by the plug-in "RemoveFieldPlugin" is supplied to the second step which consists in executing a plug-in "FilterFieldPlugin" (lines 013-022). The plug-in "FilterFieldPlugin" produces as output a result set data object "qualitycheck" (line 024).

Accordingly, at step $306_A$, the result set data object "parent" is obtained from the result set collection $309_A$ as current input to the first plug-in "RemoveFieldPlugin". At step 402, it is determined whether the plug-in "RemoveFieldPlugin" is deterministic. This determination may include determining whether a corresponding plug-in or step definition (e.g., a registered plug-in definition in the XML configuration file 160 such as described in lines 003-011 of Table II above) includes a deterministic flag. If the plug-in "RemoveFieldPlugin" is not deterministic, the plug-in "RemoveFieldPlugin" is executed at step 307 as described above. However, in the present example the first step "setup" includes an attribute "deterministic" (line 003) which is set to "yes", thereby indicating that the plug-in "RemoveFieldPlugin" is deterministic. As the plug-in "RemoveFieldPlugin" is deterministic, it is determined at step 404 whether the plug-in "RemoveFieldPlugin" has been executed previously on previous input and whether previous output has been stored persistently (i.e., as a saved result set data object 168 in a saved result set collection 408). If the deterministic plug-in "RemoveFieldPlugin" has not been executed previously or if no previous output has been stored, the deterministic plug-in "RemoveFieldPlugin" is executed at step 307 and a corresponding result set data object is produced. The produced result set data object is then stored as a saved result set data object in the saved result set collection 408 at step 410. Processing then continues at step 308 as described below. However, if the deterministic plug-in "RemoveFieldPlugin" has been executed previously and the previous output has been stored persistently together with the previous input, the previous input can be retrieved from the saved result set data object. Then, at step 404, it is further determined whether the previous input is identical to the current input. If the previous and current inputs are identical, it can be assumed that the deterministic plug-in "RemoveFieldPlugin" will produce current output identical to the previous output when executed.

It should be noted that in various embodiments it may be required to check whether different input requirements are fulfilled in order to ensure that current and previous outputs are identical, even if a particular step or plug-in (e.g., plug-in 162) is determined to be deterministic. For instance, if the current input is a current query and the particular plug-in 162 executes the current query on relevant data of one or more databases (e.g., database(s) 156), the current output is a current query result set (e.g., query result set 222). Assume that in a previous execution of a previous query identical to the current query a previous query result set has been produced. However, if the relevant data has been changed since the previous execution, the current query result set may not be identical to the previous query result set even if the previous and current inputs are identical and the particular plug-in is deterministic. Therefore, a determination is required as to whether the relevant data has been changed since the previous execution of a given step. Accordingly, for instance at step 404, a timestamp is retrieved which indicates a point of time of the previous execution. Then, a transaction log for the database(s) is retrieved and parsed in order to determine whether transactions related to the relevant data have occurred since the determined point of time. If no transactions have occurred, the relevant data has not been changed since the previous execution. Accordingly, the current query result will be identical to the previous query result.

Accordingly, if it is determined that the previous output and the current output will be identical, execution of the plug-in "RemoveFieldPlugin" can be omitted. Instead, a saved result set data object 168 representing the previous output can be retrieved from the saved result set collection 408 at step 406. Thus, the retrieved saved result set data object 168 can be loaded at step 406 as current output for the plug-in "RemoveFieldPlugin" without re-executing the plug-in at step 307.

At step 308, the result set data object 165 produced at step 307 and saved at step 410 or the saved result set data object 168 loaded at step 406 is placed back into the result set collection $309_A$. Execution of the first step, i.e., execution of the plug-in "RemoveFieldPlugin" is thus completed. Then the loop of operations is performed as described above for the second step which consists in executing a plug-in "FilterFieldPlugin". Once the loop of operations has been performed for each plug-in, the final results "qualitycheck" (line 024 of Table II) are returned to the application 120 and may be presented to the user via the query interface 122, as described above with reference to FIG. 3A.

CONCLUSION

In various embodiments, the invention provides numerous advantages over the prior art. For instance, in one embodiment a method is provided for efficiently executing a multi-step workflow by invoking and integrating corresponding multiple functional modules without requiring data transformation and data mapping. Thus, by invoking just one functional module, the user may be able to invoke all selected functional modules required for the multi-step workflow. Accordingly, the user's experience with the application may be greatly enhanced.

In another embodiment, a method for optimizing repeated executions of deterministic steps of a multi-step workflow is provided. Each deterministic step is presumed to produce the same output in different executions for identical input. However, if a deterministic step requires accessing one or more databases, the step can only produce the same output in the different executions if relevant data of the database has not been changed between the different executions. This can be determined by gathering information concerning transactions performed on the relevant data from transaction logs of the database(s). If no transactions occur between the different executions of the deterministic step, the same output can always be reused without re-executing the step.

In order to enable reuse of the same output for the different executions, the same output is stored persistently and can, thus, be retrieved at each execution of the step. However, for optimizing required storage capacity for storing different outputs of different steps, it is contemplated that only the output of deterministic steps is considered as candidates for storing. This eliminates non-deterministic steps from requiring additional resources. Furthermore, an execution duration can be determined for each deterministic step, for instance, by tracking start and end time of the execution of the step. Thus, the execution duration can be compared to a predetermined threshold. In one embodiment, if the execution duration does not exceed the predetermined threshold, it is assumed that it is more efficient to re-execute the step each time it is invoked instead of storing the corresponding output. If, however, the execution duration exceeds the predetermined threshold, it is assumed that re-execution of the step requires too much processing or time, and/or too many resources. Consequently, it is considered more efficient to save the corresponding output for subsequent executions of the step. Accordingly, candidates which can be easily and rapidly processed by re-execution of the step would not require additional resources. In another embodiment, if the output of a given deterministic step would require too much storage capacity, it can also be excluded from storing. To this end, the required storage capacity for a given step can be compared to a predetermined threshold to determine whether too much storage is used for the given step. Furthermore, in one embodiment, various known caching algorithms can be used to manage a number of outputs that are stored persistently. Accordingly, outputs can be removed from storage if no more storage capacity is available. To this end, a "least recently used" strategy may, for instance, be implemented. Moreover, in one embodiment, instead of storing the input for each deterministic step, a hash code of each input is stored in a hash table to minimize required storage capacity. Thus, if current input is received, a hash code is generated for the current input and compared to all hash codes in the hash table. Furthermore, in order to minimize required storage capacity for saved outputs, each saved output can be compressed before storing.

While the foregoing is directed to embodiments of the present invention, other and further embodiments of the invention may be devised without departing from the basic scope thereof, and the scope thereof is determined by the claims that follow.

What is claimed is:

1. A computer-implemented method of execution of a multi-step workflow that is repeatedly executed on data of a database, wherein the workflow is defined by a plurality of steps, each step being an executable function that operates on input from a previous step and produces output for a subsequent step and each step having a defined input format and output format, the method comprising:

receiving current input to a step of the workflow on relevant data of the database, wherein the step has been previously executed on the relevant data using previous input identical to the current input and wherein the previous execution of the step produced previous output;

determining whether the step is deterministic, in that the step generates identical output for given input in repeated executions of the step on the relevant data; and if the step is deterministic, returning the previous output produced during the previous execution of the step without re-executing the step.

2. The method of claim 1, further comprising using the returned previous output as input to a next sequential step in the workflow.

3. The method of claim 1, wherein determining whether the step is deterministic comprises determining whether a workflow description of the step includes a deterministic flag indicating that the step generates identical output for given input in repeated executions of the step on the relevant data.

4. The method of claim 1, further comprising:
determining whether the current input and the previous input are the same; and
returning the previous output produced during the previous execution of the step only if the current input and the previous input are determined to be the same.

5. The method of claim 4, wherein determining whether the current input and the previous input are the same comprises accessing a hash table representative of the previous input.

6. The method of claim 1, further comprising:
determining whether the relevant data has been changed since the previous execution; and
returning the previous output produced during the previous execution of the step only if the relevant data has not been changed.

7. The method of claim 6, wherein determining whether the relevant data has been changed comprises:
determining a timestamp indicating a point of time of the previous execution; and
determining, from a transaction log of the database, whether transactions relative to the relevant data have occurred since the point of time indicated by the timestamp.

8. The method of claim 6, further comprising:
if the relevant data has been changed since the previous execution:
executing the step on the relevant data to obtain a result; and
storing the result as output to be returned for subsequent invocations of the step taking input identical to the current input, in which case execution of the step is avoided and the stored output is returned for the step.

9. The method of claim 1, wherein the current input comprises one or more result fields and input parameters.

10. A computer-implemented method of managing execution of a workflow that is repeatedly executed on data of a database, wherein the workflow is defined by a plurality of steps, each step being an executable function that operates on input from a previous step and produces output for a subsequent step and each step having a defined input format and output format, the method comprising:
receiving current input for execution of a step of the workflow on relevant data of the database;
identifying the step as deterministic, in that the step generates identical output for given input in repeated executions of the step on the relevant data;
upon determining that the step has been previously executed using input identical to the current input:
returning output obtained in the previous execution of the step using input identical to the current input without executing the step using the received current input; and
upon determining that the step has not been previously executed using input identical to the current input:
executing the step for the current input on the relevant data to obtain a result; and
storing the result to enable managing a next invocation of the step in which the step is passed input identical to the current input, in which case the stored result is returned as output for the step without re-executing the step.

11. The method of claim 10, further comprising, upon determining that the step has been previously executed using input identical to the current input and prior to returning the output:
determining whether the relevant data has been changed since the previous execution of the step using the input identical to the current input; and
if the relevant data has not been changed, retrieving the output obtained in the previous execution of the step using the input identical to the current input.

12. The method of claim 11, wherein determining whether the relevant data has been changed comprises:
determining a timestamp indicating a point of time of the previous execution; and
determining, from a transaction log of the database, whether transactions relative to the relevant data have occurred since the point of time indicated by the timestamp.

13. A computer readable storage medium containing a program which, when executed by a processor, performs an operation of managing execution of a multi-step workflow that is repeatedly executed on data of a database, wherein the workflow is defined by a plurality of steps, each step being an executable function that operates on input from a previous step and produces output for a subsequent step and each step having a defined input format and output format, the operation comprising:
receiving current input to a step of the workflow on relevant data of the database, wherein the step has been previously executed on the relevant data using previous input identical to the current input and wherein the previous execution of the step produced previous output;
determining whether the step is deterministic, in that the step generates identical output for given input in repeated executions of the step on the relevant data; and
if the step is deterministic, returning the previous output produced during the previous execution of the step without re-executing the step.

14. The computer readable storage medium of claim 13, wherein the operation further comprises:
inputting the returned previous output to a next sequential step in the workflow.

15. The computer readable storage medium of claim 13, wherein determining whether the step is deterministic comprises determining whether a workflow description of the step includes a deterministic flag indicating that the step generates identical output for given input in repeated executions of the step on the relevant data.

16. The computer readable storage medium of claim 13, wherein the operation further comprises:
determining whether the current input and the previous input are the same; and
returning the previous output produced during the previous execution of the step only if the current input and the previous input are determined to be the same.

17. The computer readable storage medium of claim 16, wherein determining whether the current input and the previous input are the same comprises accessing a hash table representative of the previous input.

18. The computer readable storage medium of claim 13, wherein the operation further comprises:
determining whether the relevant data has been changed since the previous execution; and returning the previous output produced during the previous execution of the step only if the relevant data has not been changed.

19. The computer readable storage medium of claim 18, wherein determining whether the relevant data has been changed comprises:
retrieving a timestamp indicating a point of time of the previous execution; and
retrieving a transaction log of the database; and
determining, from the transaction log, whether transactions relative to the relevant data have occurred since the point of time indicated by the timestamp.

20. The computer readable storage medium of claim 18, wherein the operation further comprises:
if the relevant data has been changed since the previous execution:
executing the step on the relevant data to obtain a result; and
storing the result as output to be returned for subsequent invocations of the step taking input identical to the current input, in which case execution of the step is avoided and the stored output is returned for the step.

21. The computer readable storage medium of claim 13, wherein the current input comprises one or more result fields and input parameters.

22. A computer readable storage medium containing a program which, when executed by a processor, performs an operation of managing execution of a workflow that is repeatedly executed on data of a database, wherein the workflow is defined by a plurality of steps, each step being an executable function that operates on input from a previous step and produces output for a subsequent step and each step having a defined input format and output format, the operation comprising:
receiving current input for execution of a step of the workflow on relevant data of the database, wherein the step generates identical output for given input in repeated executions of the step on the relevant data; and
without executing the step using the current input, returning output obtained in a previous execution of the step using input identical to the current input.

23. The computer readable storage medium of claim 22, wherein the operation further comprises, prior to returning the output:
determining whether the step has been previously executed using the input identical to the current input;
if so, determining whether the relevant data has been changed since the previous execution of the step using the input identical to the current input; and
if the relevant data has not been changed, retrieving the output obtained in the previous execution of the step using the input identical to the current input.

24. The computer readable storage medium of claim 23, wherein determining whether the relevant data has been changed comprises:
retrieving a timestamp indicating a point of time of the previous execution;
retrieving a transaction log of the database; and
determining, from the transaction log, whether transactions relative to the relevant data have occurred since the point of time indicated by the timestamp.

25. The computer readable storage medium of claim 23, wherein the operation further comprises:
if the step has not been executed using the input identical to the current input:
executing the step for the current input on the relevant data to obtain a result; and
storing the result to enable managing a next invocation of the step in which the step is passed input identical to the current input, in which case the stored result is returned as output for the step without re-executing the step.

26. The computer readable storage medium of claim 23, wherein the operation further comprises:
if the relevant data has been changed since the previous execution of the step using the input identical to the current input:
executing the step for the current input on the relevant data to obtain a result; and
storing the result to enable managing a next invocation of the step in which the step is passed input identical to the current input, in which case the stored result is returned as output for the step without re-executing the step.

27. A computer system, comprising:
a database having data; and
a workflow execution manager residing in memory for managing execution of a multi-step workflow that is repeatedly executed on the data of the database, wherein the workflow is defined by a plurality of steps, each step being an executable function that operates on input from a previous step and produces output for a subsequent step and each step having a defined input format and output format, the workflow execution manager being configured for:
receiving current input to a step of the workflow on relevant data of the database, wherein the step has been previously executed on the relevant data using previous input identical to the current input and wherein the previous execution of the step produced previous output;
determining whether the step is deterministic, in that the step generates identical output for given input in repeated executions of the step on the relevant data; and
if the step is deterministic, returning the previous output produced during the previous execution of the step without re-executing the step.

28. A computer system, comprising:
a database having data; and
a workflow execution manager residing in memory for managing execution of a workflow that is repeatedly executed on the data of the database, wherein the workflow is defined by a plurality of steps, each step being an executable function that operates on input from a previous step and produces output for a subsequent step and each step having a defined input format and output format, the workflow execution manager being configured for:
receiving current input to a step of the workflow on relevant data of the database, wherein the step generates identical output for given input in repeated executions of the step on the relevant data; and
without executing the step using the current input, returning output obtained in a previous execution of the step using input identical to the current input.

29. A computer-implemented method of automatically executing a plurality of functional modules from within an application, comprising:
providing an interface for specifying a single multi-analysis functional module used to execute the plurality of functional modules, whereby user selection of the single multi-analysis functional module is an implicit selection of the plurality of functional modules, and wherein each of the plurality of functional modules is an executable function that operates on input from a previous functional module and produces output for a subsequent functional module and each functional module having a defined input format and output format;

receiving current input to at least one of the functional modules, wherein the at least one functional module has been previously executed using previous input identical to the current input;

determining whether the at least one functional module is deterministic, in that the at least one functional module generates identical output for given input in repeated executions of the at least one functional module; and if the at least one functional module is deterministic, returning previous output produced during the previous execution without re-executing the at least one functional module.

30. The method of claim 29, further comprising retrieving information regarding execution of the plurality of functional modules from a configuration file.

31. The method of claim 30, wherein determining whether the at least one functional module is deterministic comprises examining information regarding the at least one functional module retrieved from the configuration file.

32. A computer-implemented method of managing execution of a workflow that is repeatedly executed on data of a database, wherein the workflow is defined by a plurality of steps, each step being an executable function that operates on input from a previous step and produces output for a subsequent step and each step having a defined input format and output format, the method comprising:

receiving current input for execution of a step of the workflow on relevant data of the database;

identifying the step as deterministic, in that the step generates identical output for given input in repeated executions of the step on the relevant data;

upon determining that the step has been previously executed using input identical to the current input, determining whether the relevant data has been changed since the previous execution of the step using the input identical to the current input;

if the relevant data has been changed since the previous execution of the step using the input identical to the current input:

executing the step for the current input on the relevant data to obtain a result; and storing the result to enable managing a next invocation of the step in which the step is passed input identical to the current input, in which case the stored result is returned as output for the step without re-executing the step; and if the relevant data has not been changed since the previous execution of the step using the input identical to the current input:

returning output obtained in the previous execution of the step using the input identical to the current input without executing the step using the received current input.

* * * * *

UNITED STATES PATENT AND TRADEMARK OFFICE
CERTIFICATE OF CORRECTION

PATENT NO. : 7,610,263 B2 Page 1 of 1
APPLICATION NO. : 10/733973
DATED : October 27, 2009
INVENTOR(S) : Dettinger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1302 days.

Signed and Sealed this

Twelfth Day of October, 2010

David J. Kappos
*Director of the United States Patent and Trademark Office*